United States Patent
Caruk

(10) Patent No.: US 11,301,410 B1
(45) Date of Patent: Apr. 12, 2022

(54) TAGS FOR REQUEST PACKETS ON A NETWORK COMMUNICATION LINK

(71) Applicant: Advanced Micro Devices, Inc., Santa Clara, CA (US)

(72) Inventor: Gordon Caruk, Brampton (CA)

(73) Assignee: ADVANCED MCIRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/120,208

(22) Filed: Dec. 13, 2020

(51) Int. Cl.
| | |
|---|---|
| *G06F 13/42* | (2006.01) |
| *G06F 9/54* | (2006.01) |
| *G06F 13/40* | (2006.01) |
| *G06F 15/173* | (2006.01) |
| *G06F 13/364* | (2006.01) |

(52) U.S. Cl.
CPC ........ *G06F 13/4221* (2013.01); *G06F 13/364* (2013.01); *G06F 13/4068* (2013.01); *G06F 15/173* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,542,078 A | * | 7/1996 | Martel | G06F 16/289 |
| 2007/0028017 A1 | * | 2/2007 | Mishra | G06F 13/4221 |
| | | | | 710/52 |
| 2013/0138647 A1 | * | 5/2013 | Falkenberg | G06F 16/2428 |
| | | | | 707/736 |
| 2014/0201303 A1 | * | 7/2014 | Dalal | G06F 13/1652 |
| | | | | 709/212 |
| 2018/0083863 A1 | * | 3/2018 | Zhu | H04L 45/245 |

* cited by examiner

*Primary Examiner* — Hyun Nam
(74) *Attorney, Agent, or Firm* — Park, Vaughan, Fleming & Dowler LLP

(57) ABSTRACT

An electronic device includes a requester and a link interface coupled between the requester and a link. The requester is configured to send a request packet to a completer on the link via the link interface. When sending the request packet to the completer, the requester sends, to the completer via the link interface, the request packet with a tag that is not unique with respect to tags in other request packets from the requester that will be in the internal elements of the completer before the request packet is in the internal elements of the completer, but that is unique with respect to tags in other request packets from the requester that will be in the internal elements of the completer while the request packet is in the internal elements of the completer.

20 Claims, 4 Drawing Sheets

TAGS FOR REQUEST PACKETS ON A NETWORK COMMUNICATION LINK

BACKGROUND

Related Art

In some electronic devices, functional blocks, devices, and elements use network communication links for exchanging information (i.e., data, messages, control values, etc.) and performing other operations. For example, a graphics processing unit (GPU) can use network communication links to transmit memory access requests to a memory and the memory can return (when necessary) data to the GPU via the network communication links. Communications using network communication links are typically performed in accordance with the rules and requirements of a communication specification (or protocol, standard, etc.) that dictates how communications are carried out on the network communication links. For example, the communication specification may dictate the timing of packets, messages, etc, the arrangement and formatting of information in the packets, messages, etc., the operations that should be supported by endpoints (e.g., functional blocks, devices, or elements) or intermediary devices (e.g., switches, repeaters, etc.), etc. One well-known communication specification used for network communication links is the Peripheral Component Interface Express (PCI Express or PCIe) specification, which was developed and is maintained by the Peripheral Component Interface Special Interest Group (PCI SIG) of Beaverton, Oreg. The PCIe specification includes detailed rules and requirements for operations for PCIe endpoints and intermediary devices that are to use PCIe links. For example, some of the rules for using PCIe links are included in the PCI Express Base Specification Revision 5.0 Version 1.0, which was released by the PCI SIG on 22 May 2019.

Among the rules in the PCIe specification is a rule that a transaction descriptor must be included in requests (i.e., in the header of request packets) to be used for identifying requests that require a completion. For example, a GPU must include a transaction descriptor in read memory access requests that are sent to a memory—and that require completion in the form of response packets that are sent from the memory to the GPU with the respective requested data. The transaction descriptor is formed from two different sub-fields, an M bit requestor ID and an N-bit tag (where M=16, 20, or another number and N=10, 16, or another number). The requestor ID is a fixed identifier that identifies a requester among a set of endpoints, such as a specified combination of a requester's bus number, device number, and function number. The tag is a value that is generated by a given requestor for each request packet to identify that request packet to the requester. In accordance with the PCIe specification, the tag in each outstanding request from a given requester that requires a completion (i.e., a response packet from a completer) should be unique.

In some cases, the above-described requirement that the tags included by requesters in each outstanding request be unique can lead to inefficient operation. This can occur because higher speed requesters (i.e., endpoints, etc.) and/or requesters in higher-latency topologies (e.g., with multiple links and/or intermediary devices, etc.) can transmit sufficient outstanding requests to run out of tag values. In other words, in some cases, requestors can send out sufficient request packets with different N-bit tag values to run out of tag values before responses to requests—and thus the tags associated therewith—begin to be returned from a completer. When this occurs, the requester is forced to stall. The requester remains stalled until responses to the requests with the respective tags are returned from the completer. When tags have been returned to the requester in responses, the requester can resume sending requests by reusing the tags in subsequent requests.

Because stalling upon running out of tags hampers the performance of a requester, designers have proposed workarounds. For example, the PCIe specification describes using "phantom function numbers," which involves requesters using unclaimed function numbers in transaction descriptors in place of the above-described requester IDs. Although enabling a larger number of request packets to be sent, using phantom function numbers requires that requesters include circuitry for performing the associated control and processing operations. As another example, some requester/completer pairs are able to "reuse" tags. In such electronic devices, both the completer and requester must include circuitry for recognizing and handling duplicate tags. Although the proposed mechanisms enable the avoidance of at least some stalls, they are associated with processing overhead, design complexity, and/or other complications.

BRIEF DESCRIPTION OF THE FIGURES

Throughout the figures and the description, like reference numerals refer to the same figure elements.

DETAILED DESCRIPTION

Figure 1:
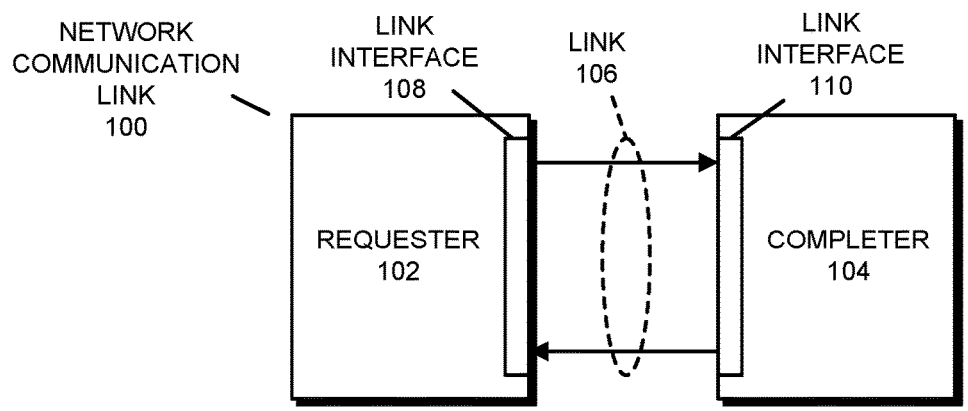
FIG. 1 presents a block diagram illustrating a network communication link in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Peripheral Component Interconnect Express: Peripheral Component Interconnect Express (i.e., PCI Express, PCIe, etc.) is a specification for communication on network communication links, or "PCIe links." The PCIe specification (which is composed of a number of separate specifications) dictates rules and guidelines for communicating on PCIe links, such as rules regarding the capabilities and compatibilities required for hardware and/or software elements that communicate on PCIe links, rules regarding the content and arrangement of request and response packets transmitted on PCIe links, etc. For example, a PCIe "base" specification that includes many basic rules and guidelines for communicating on PCIe links can be found in PCI Express Base Specification Revision 5.0 Version 1.0, which was published by the PCI Special Interest Group (PCI SIG) of Beaverton, Oreg. in May of 2019, and which is incorporated by reference herein. As another example, a draft PCIe base specification can be found in PCI Express Base Specification Revision 6.0 Version 0.5, which was published by the PCI SIG on 24 Feb. 2020, and which is incorporated by reference herein.

Endpoint: an endpoint is an actual or virtual functional block, device, and/or other element on or connected to a network communication link (e.g., a PCIe link, etc.) that can communicate with other endpoint(s) via the network communication link. For example, an endpoint can be an initiator or a completer of transactions involving other endpoint(s) on the network communication link. In some cases, a single functional block, device, or element provides or performs multiple functions, possibly including virtualized functions, each of which can be considered its own endpoint.

Overview

In the described embodiments, endpoints communicate with one another using network communication links, or, more simply, "links." For example, in some embodiments, a pair of endpoints communicates with one another via a single Peripheral Component Interconnect Express (PCIe) link. As another example, in some embodiments, two or more endpoints communicate over two or more separate PCIe links. As yet another example, in some embodiments, two or more endpoints communicate with one another via one or more intermediary functional blocks or devices (e.g., switches, repeaters, root complexes, etc.) over two or more separate network communication links including at least one PCIe link. For communicating using the link(s), the endpoints perform "transactions," which are the basis for information transfer between the endpoints. Transactions include various forms of information transfer such as memory transactions, input-output (10) transactions, configuration transactions, messaging transactions, etc. Transactions involve a requesting endpoint, or "requester," transmitting, via one or more links, a request to a completing endpoint, or "completer," to request an action from and/or communicate information to the completer. When the request entails a response (e.g., returned data, an acknowledgement, etc.), the completer returns, via one or more links, a response to the requester.

In the described embodiments, a communication specification (or standard, protocol, etc.) in use on the link(s) dictates that requesters include tags in specified request packets in which requests are transmitted over link(s) to completers. Tags are multi-bit/byte values that requesters include in request packets (e.g., in headers of request packets) that are used for identifying the request packet among two or more request packets that are transmitted from the requester. The communication specification further dictates that all outstanding request packets with tags from a requester should have unique tags with respect to tags in other outstanding request packets from the requester. In other words, all request packets in flight/being transmitted on network links, in internal elements of intermediary devices (e.g., in buffers/queues, processing elements, etc.), in internal elements of the completer, etc. and the corresponding response packets should have unique tags. From the time when a request packet with a given tag is generated in the requester until a response packet is returned with the given tag, therefore, the request packet is considered outstanding and the communication standard dictates that the requester should not reuse the given tag. Generally, the tags in outstanding request packets are to be unique so that completers can process request packets out of order and return response packets, which include tags from respective request packets, out of order with respect to an order in which the corresponding request packets were sent. The requester can then be assured that a tag in a response packet returned from the requester is associated with a particular request packet—and not a subsequent request packet for which the requester reused the same tag.

Although, in accordance with the communication specification, outstanding request packets from a requester at any given time should have unique tags, the concern is more with the request packets that will be in internal elements of the completer simultaneously. The operational correctness of requesters and/or completers should not be affected when request packets that are in flight between the requester and the completer do not have unique tags with respect to the request packets in internal elements of the completer. In other words, request packets in the requester (e.g., generated but not yet sent) and in intermediary devices and links between the requester and completer (i.e., "in flight" request packets) can have the same tags as request packets within the completer without causing incorrect operation of the requester and/or completer. This is true because in flight request packets are not present in the internal elements of the completer and therefore cannot be reordered by the completer with respect to other request packets in the internal elements of the completer. The above described reordering problem therefore does not occur for in flight packets with such duplicated tags. There is therefore a moving "window" of request packets in any long enough sequence of request packets transmitted from a requester to a completer in which each of the request packets should have a unique tag with respect to each other. The window of request packets includes sufficient request packets to fill/occupy the internal elements of the completer. For example, if the completer can hold/store a maximum of 100 request packets in its internal elements, then the window would include 100 request packets—i.e., be 100 request packets "wide" or "long." Tags in request packets that are outside of a given window, however, can be duplicates of tags inside of the given window without causing incorrect operation of the requester and/or completer.

In the described embodiments, requesters take advantage of the fact that the tags of in flight request packets can be duplicates of, i.e., need not be unique with respect to, tags in internal elements in the completer to continue sending request packets to completers in situations in which existing requesters are forced to stall. The requesters do this by, in contravention of the communication standard's rules, continuing to send request packets to completers with tags that are not unique with respect to tags in request packets from the requester that will be in the internal elements of the completer while the request packets are in flight, i.e., before the request packets are themselves in the internal elements of the completer. In order to avoid the reordering issue addressed by the above-described communication specification rule regarding tags in request packets, however, requesters ensure that tags in request packets will be unique with respect to tags in other request packets that will be in the internal elements of the completer along with the request packets. In other words, and continuing the moving window example, in the described embodiments, tags in request packets in a given window will be unique with respect to one another, but tags in request packets outside of the given window are not assured of being unique with respect to tags in request packets in the given window.

In some embodiments, requesters use sequential tags for ensuring that tags in request packets will be unique with respect to tags in other request packets that will be in the internal elements of the completer at the same time as the request packets. In these embodiments, a requester knows or assumes that the capacity of the internal elements of the completer for holding/storing request packets with tags is smaller than a number of allowable tags. When sending request packets to a completer, therefore, the requester sends request packets in a sequence of request packets with respective sequential tags—and starts over with a lowest allowable tag once a highest allowable tag has been included in a request packet—or otherwise restarts a sequence of tags for packets (e.g., using Grey codes, etc.). For example, in an embodiment in which three bit tags are used, request packets with tags 000, 001, 010, . . . 110, 111 can be outstanding for a requester, but the requester can continue to send request packets with tags starting from 000. In other words, the requester does not halt sending request packets, despite each allowable tag having been included in an outstanding request packet, but instead automatically continues sending request packets with tags in sequence. Because the capacity of the internal elements of the completer for holding/storing request packets is smaller than the number of allowable tags, these embodiments can be assured that, or assume that, the sequence of/sequential tags in the internal elements of the completer at any given time will be unique with respect to one another.

In some embodiments, and differently than the above-described embodiments that use sequential tags, when sending a request packet to a completer, a requester determines what tags can be used in the request packet. Generally, for this operation, the requester determines whether, when the request packet arrives at the completer (i.e., just before the request packet is taken in to the internal elements of the completer), internal elements of the completer will be full of request packets from the requester. Continuing the moving window example, the requester therefore determines if a full window of request packets will be in the completer at the time of the request packet's arrival. If so, the requester can send a request packet with a tag that is not unique with respect to tags in request packets from the requester that will be in the internal elements of the completer when the request packet arrives at the completer. Otherwise, the requester sends the request packet with a tag that is unique with respect to tags in other request packets from the requester that will be in the internal elements of the completer while the request packet is in the internal elements of the completer. That is, the requester generates and sends a request packet within a given window.

In some embodiments, for determining whether, when a request packet arrives at a completer, internal elements of the completer will be full of request packets from the requester that have unique tags, a requester determines if a given number of request packets have been sent to the completer without receiving corresponding response packets. In some embodiments, for determining whether, when a request packet arrives at a completer, internal elements of the completer will be full of request packets from the requester that have unique tags, a requester uses a information about the sending link/internal element latency for request packets. The sending link/internal element latency in these embodiments is the highest total or average typical time expected for request packets to be passing through/present in the sending link and the internal elements of the completer. In some embodiments, for determining whether, when a request packet arrives at a completer, internal elements of the completer will be full of request packets from the requester that have unique tags, a requester uses information about an arrangement or configuration of intermediary network devices and/or internal elements in the completer. For example, the requester can use information about a maximum capacity or a present/current capacity for storing or buffering request packets in the intermediary network devices and/or internal elements of the completer (i.e., the circuitry in which request packets can be stored in the intermediary network devices and/or internal elements of the completer).

In some embodiments, requesters can be selectively configured to use tags in request packets as described herein. In other words, the above-described use of non-unique tags in request packets can be enabled and disabled, e.g., at installation time, at manufacture time, at runtime, and/or at another time. In these embodiments, the requester provides a hardware or software switch or configuration setting that enables or disables the use of such tags in request packets. For example, in some embodiments, the hardware switch is or includes a switch circuit, a fuse, etc. When the hardware or software switch or configuration setting is disabled, the requester uses tags for request packets as in existing devices—and thus stalls transmitting request packets upon using all of the allowable tags in request packets that remain outstanding. In contrast, when the hardware or software switch is enabled, the requester can use non-unique tags for outstanding request packets as described herein.

In some embodiments, requesters send out request packets at a sufficiently high rate and/or the latency of the link(s) between requester and completers is sufficiently long (e.g., due to larger numbers of intermediary devices, longer physical link lengths, etc.) that taking advantage of in flight packets to continue to send request packets using non-unique tags as described herein can lead to an increase in the number of request packets that a requester is able to send. When the requester can send more request packets (and thus can acquire data from memory, send data to or receive data from IO devices more quickly, etc.), the performance of the requester increases. The increase in the performance of the requester can increase the overall performance of an electronic device in which the requester is included, thereby increasing user satisfaction.

Network Communication Link

In the described embodiments, a requester and a completer perform transactions via a network communication link. FIG. 1 presents a block diagram illustrating a network communication link 100 in accordance with some embodiments. As can be seen in FIG. 1, network communication link 100 includes requester 102 and completer 104, which are connected via link 106. Requester 102 and completer 104 are endpoints that are or are incorporated in functional blocks, devices, and/or other elements that perform transactions on link 106. For example, in some embodiments, requester 102 is a functional block such as a graphics processing unit (GPU) or central processing unit (CPU) and completer 104 is a functional block such as a memory controller or a network interface. In some of these embodiments, requester 102 and completer 104 are implemented in integrated circuitry on the same or separate semiconductor chips. As another example, in some embodiments, requester 102 is a graphics card or a peripheral card plugged into or connected to a bus or interface in an electronic device (e.g., a desktop computer, server computer, etc.) and completer 104 is a memory controller that is also plugged into or connected to the bus or interface.

In the described embodiments, requester 102 and completer 104 include internal elements, i.e., circuitry, devices, etc., for sending and receiving packets such as request packets and/or response packets via link 106. For example, the internal elements can include receiving elements for receiving request and/or response packets, processing elements for processing request and/or response packets, and transmitting elements for transmitting request and/or response packets. The particular circuitry, devices, etc. that are included in the internal elements depends on the nature of the packets that are handled and processed by the internal elements and the operations performed by the internal elements. For example, in some embodiments, receiving elements for receiving request and/or response packets can include buffer or memory circuitry for storing the packets, processing circuitry for checking packet information and preparing packets for subsequent processing operations, steering circuitry for directing packets (or portions thereof) to processing circuitry for processing therein, processing circuitry for processing or handling the packets (or portions thereof), etc.

Link 106 includes signal routes (e.g., wires, guides, buses, etc.) that are used for transmitting packets between requester 102 and completer 104. For example, in some embodiments, requester 102 and completer 104 are functional blocks implemented on a semiconductor chip using integrated circuits and link 106 includes wires, guides, or traces implemented on the semiconductor chip. As another example, in some embodiments, requester 102 and completer 104 are functional blocks or devices in a data center and link 106 includes wires, guides, or traces on one or more circuit boards and/or packages and/or wires, guides, or traces between circuit boards and/or packages.

In the embodiment shown in FIG. 1, link 106 includes separate unidirectional signaling routes for transmitting packets in a sending direction and for receiving packets in a receiving direction (because there is a unidirectional signal route in each direction, which of the two signaling routes is in the sending/receiving direction depends on whether the perspective is from requester 102 or completer 104). For example, in some embodiments, each of the signal routes is a unidirectional differential link. Requester 102 and completer 104 each include a respective link interface 108 or 110 that includes circuitry (e.g., buffers, drivers, sense amplifiers, etc.) for transmitting or receiving packets on the respective transmit or receive link.

Although network communication link 100 is shown in FIG. 1 with certain elements, in some embodiments, network communication link 100 includes different or differently arranged elements. For example, although shown with a single transmit and receive link pair, in some embodiments, link 106 includes two or more transmit and receive link pairs (each transmit and receive link pair can be called a "lane"), that can be used together or separately for transmitting packets between requester 102 and completer 104. As another example, in some embodiments, although labeled as a requester and a completer in FIG. 1, requester 102 can also be a completer and completer 104 can also be a requester. Generally, in the described embodiments, network communication link 100 includes sufficient functional blocks and elements suitably arranged to perform the operations described herein.

Network communication link 100 can be wholly or partially included in any device that performs the operations described herein. For example, some or all of network communication link 100 can be, or can be included in, a desktop computer, a laptop computer, a wearable computing device, a tablet computer, a network, a communication subsystem or channel, a piece of virtual reality or augmented reality equipment, a smart phone, an artificial intelligence (AI) or machine learning device, a server, a network appliance, a toy, a piece of audio-visual equipment, a home appliance, a vehicle, etc., and/or combinations thereof. In other words, these devices can entirely include network communication link 100 (e.g., within or between semiconductor chips) or can be a requester and/or completer on a network communication link 100.

Topology

Figure 2:
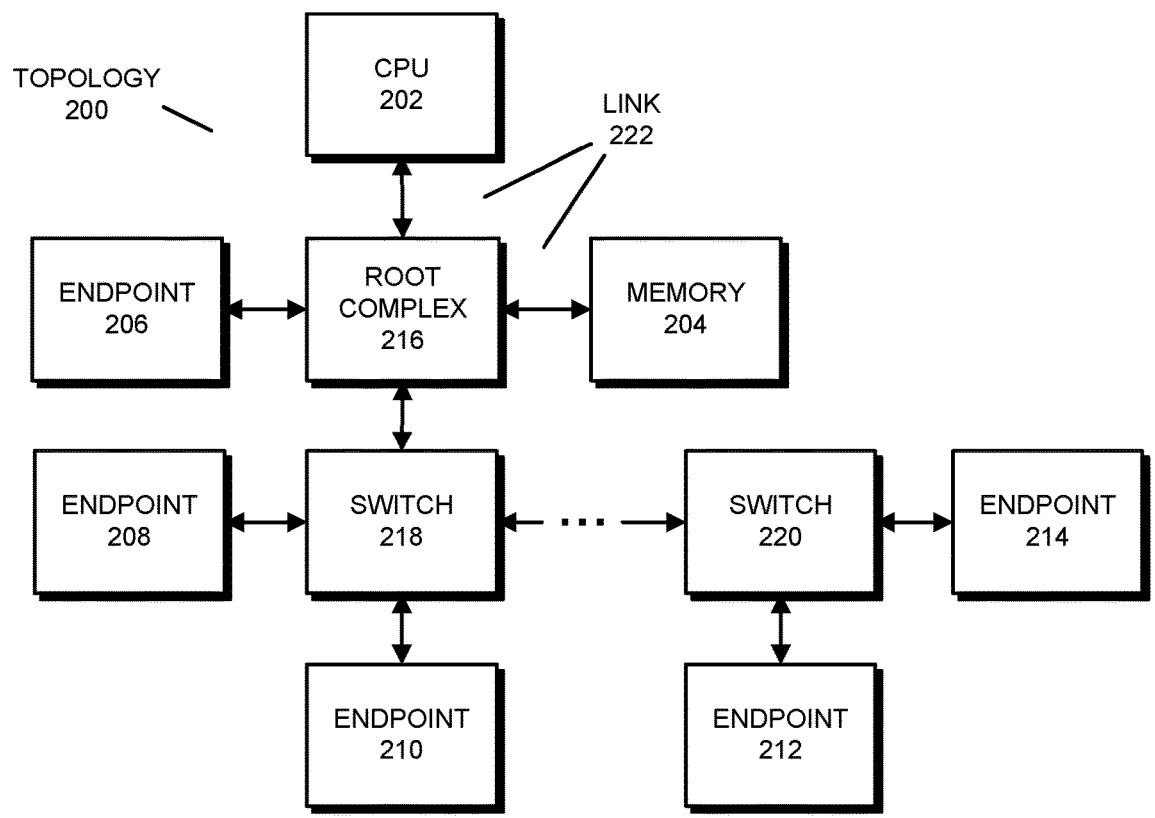
FIG. 2 presents a block diagram illustrating a topology in accordance with some embodiments.

In some embodiments, endpoints (i.e., functional blocks, devices, and other elements) are part of a network topology that includes a number of endpoints—and at least some of the endpoints function as requesters and/or completers with respect to other endpoints in the topology. The topology may also include a number of intermediary devices between the endpoints and/or other intermediary devices. FIG. 2 presents a block diagram illustrating a topology 200 in accordance with some embodiments. As can be seen in FIG. 2, topology 200 includes central processing unit (CPU) 202 which is a functional block or device such as a microprocessor or microprocessor core that performs computational, control, memory access, input-output, and other operations. Topology 200 also includes memory 204, which is a functional block or device that includes memory circuitry such as dynamic random access memory (DRAM) for storing data (where "data" is a generic term for describing actual data, instructions, control values, etc.), as well as control circuitry for controlling accesses of data in the memory circuitry.

Topology 200 additionally includes endpoints 206-214, which include functional blocks, devices, or elements such as a graphics processing unit (GPU) or graphics processing unit core, input-output (IO) devices or interfaces thereto (e.g., network interfaces, disk controllers, etc.), legacy devices, etc. (Note that "legacy" devices can use a different communication specification (or standard, protocol, etc.) than the communication specification in use on other links in topology 200.) In some embodiments, some or all of endpoints 206-214 are considered "functions" that can be the requester and/or completer of transactions either on their own accord or on behalf of other devices (e.g., USB controllers, etc.) (not shown). In some of these embodiments, a single functional block, device, or element may provide or perform multiple functions (including virtualized functions), each of which can be considered its own endpoint.

Topology 200 further includes root complex 216, which is a functional block or device at a "root," or lowest level, of a hierarchy in which central processing unit 202 and memory 204 are connected to various domains that include respective endpoints 206-214 and the other devices in topology 200. In some embodiments, root complex 216 performs operations of a switch or router, routing and otherwise controlling/handling packets between central processing unit 202, memory 204, and endpoints 206-214 (via one or both of switches 218-220 for endpoints 208-214) or vice versa. In some embodiments, root complex 216 is permitted to perform operations that are not permitted to be performed by other intermediary devices (i.e., switches, routers, repeaters, etc.) such as subdividing packets for onward transmission, etc. In some embodiments, root complex 216 is a completer for the memory, handling memory access transactions on behalf of the memory.

Topology 200 further includes switches 218 and 220, which are functional blocks, devices, or other elements that perform operations for switching or routing packets between central processing unit 202, memory 204, and endpoints 206-214. In some embodiments, along with performing switching/routing operations, one or both of switches 218 and 220 perform bridging or translating operations in which packets, messages, or other network traffic from legacy and/or incompatible endpoints are translated to a communication specification in use in root complex 216. For example, in some embodiments, endpoint 208 is a legacy Peripheral Component Interconnect device, root complex 216 uses PCIe, and switch 218 translates, or bridges, Peripheral Component Interconnect packets to PCIe packets and vice versa for communications between endpoint 208 and root complex 216.

Topology 200 further includes a link 222 between each functional block, device, or element in topology 200 (only two of links 222, which are shown using double-headed arrows in FIG. 2, are labeled for clarity). Each link 222 includes at least one pair, and possibly multiple separate pairs, of unidirectional send and receive links such as those shown in link 106. For example, in some embodiments, endpoint 206 is a GPU that is connected to root complex 216 by a sixteen-lane link 222—and thus has sixteen separate unidirectional send-receive pairs.

In some embodiments, when transmitted in topology 200, communications (i.e., request packets, response packets, etc.) may traverse multiple links 222 when traveling from a requester to a completer and vice versa. For example, when endpoint 212, as a requester, is requesting a memory access from memory 204, as a completer, the request packet transverses the links 222 between endpoint 212 and switch 220, switch 220 and switch 218, switch 218 and root complex 216, and root complex 216 and memory 204. When the memory access is a memory read—and thus requests the return of data from memory 204—a response packet from memory 204 traverses the links 222 in reverse to endpoint 212. In some embodiments, the latency for traversing multiple links is relatively long. For example, there may be several intermediary devices between a requester and a completer such as between endpoint 212 and memory 204. As another example, some or all of the links between a requester and a completer may be physically long, such as with a longer wire, cable, etc. through which packets must travel (e.g., between server boxes/endpoints in a larger server farm, etc.). In some embodiments, requesters take advantage of the fact that request packets can be in flight (i.e., in intermediary devices and/or links) for a relatively long time to continue to send request packets to completers with non-unique tags as described herein.

Although topology 200 is shown with a particular arrangement of functional blocks, devices, and/or other elements, in some embodiments, topology 200 includes different functional blocks, devices, and/or other elements and/or functional blocks, devices, and/or other elements that are differently arranged. For example, in some embodiments, topology 200 is a simple endpoint-to-endpoint connection between endpoints such as that shown in FIG. 1—or is a complex topology with more endpoints and/or intermediary devices (as shown via the ellipsis in FIG. 2). As another example, in some embodiments, topology 200 includes multiple layers and/or other arrangement of switches or other intermediary devices, such as with a larger crossbar switch, etc. Generally, in the described embodiments, topology 200 includes one or more requester endpoints that perform the operations for including tags in request packets as described herein.

Transactions

In the described embodiments, a requester (e.g., requester 102, endpoint 206, etc.) initiates transactions via a link (e.g., link 106, link 222, etc.) with a completer (e.g., completer 104, endpoint 212, etc.) and the completer performs, or "completes," the transactions. Generally, transactions are operations for transferring information between the requester and the completer. For example, in some embodiments, requesters and completers perform memory transactions, for which a requester reads data from or writes data to memory (e.g., dynamic random access memory or DRAM) in or associated with a completer. As another example, in some embodiments, requesters and completers perform input-output (IO) transactions, for which a requester acquires data from or sends data to an IO functional block or device (e.g., a disk controller, network interface, etc.) in or associated with a completer. As yet other examples, in some embodiments, requesters and completers perform configuration and/or messaging transactions, for which a requester communicates configuration information and/or message information to a completer.

For a transaction, a requester transmits, via one or more links, a request to the completer to request an action from and/or communicate information to the completer. For example, assuming that the requester is a graphics processing unit, the completer is a memory controller associated with a memory, and that the transaction is a memory access, the graphics processing unit can transmit, to the memory controller via one or more links, a request packet that includes a memory access request to read specified data from a location in the memory or write specified data to a location in the memory. In some embodiments, transmitting the request packet to the completer includes the request packet passing through (i.e., being received and forwarded by) one or more intermediary devices (e.g., root complex 216 and switch 218 for a request packet from endpoint 210 to memory 204, etc.) and the respective links. When the request entails a response, the completer returns, via one or more links, a response to the requester. Continuing the graphics processing unit/memory controller example and assuming that the memory access request was a request to read specified data from a location in the memory, the memory controller can transmit, to the graphics processing unit via one or more links, a response packet that includes the requested data from the memory.

Tags in Request and Response Packets

In the described embodiments, a communication specification (or standard, protocol, etc.) in use on the link(s) in a topology (e.g., topology 200) dictates that requesters include tags in specified request packets that are used for communicating requests to completers. For example, in some embodiments, requesters are to include tags in request packets for which a completer is to send a response to the requester (e.g., for memory accesses, IO data accesses, etc.). In some of these embodiments, copies of tags from request packets are included by completers in corresponding response packets sent to requesters. Tags can be used by requesters and/or completers for operations such as identifying a request packet with which a response packet is associated, determining an order or other relationship between two or more different response packets, determining request packets for which response packets have been received, etc.

Figure 3:
FIG. 3 presents a block diagram illustrating a request packet in accordance with some embodiments.

FIG. 3 presents a block diagram illustrating a request packet 300 in accordance with some embodiments. As can be seen in FIG. 3, request packet 300 includes header 302 which has header information (INFO) 304 and tag 306. Header 302, which can be included in a first portion of request packet 300 (e.g., starting from a first byte of request packet 300), generally includes information that is used by completers, i.e., receiving functional blocks, devices, and/or elements, and other network devices to identify a type and characteristics of request packet 300. Header information 304 includes information identifying the type and characteristics of request packet 300 such as the type of the request packet among a set of possible types of request packets, control values for processing or handling the request packet, communication specification version values, quality of service values, etc. When generating request packet 300, a requester generates, determines, or otherwise acquires the information identifying the type and characteristics of request packet 300 and stores the information in corresponding fields/particular bits in header information 304. For example, a type of the request packet may be stored in one or more contiguous or non-contiguous bytes starting from a first byte of header information 304—and thus may be the first or initial information read from header information 304 by a completer or other network device.

Tag 306 is or includes a value that is used for identifying the request packet from among multiple request packets that are sent from a given requester to a completer. For example, in some embodiments, tag 306 is an N-bit value from among a set of permissible N-bit values (where N=10, 16, or another number) that is included in a contiguous or non-contiguous sequence of bytes and/or bits in header 302. For instance, in some embodiments, request packet 300 is a PCIe request packet and tag 306 is included in header 302 as part of a transaction descriptor, the transaction descriptor including tag 306 and a requester identifier (ID) that identifies the requester among endpoints in a network topology. When generating request packet 300, a requester generates, determines, or otherwise acquires a value for tag 306 and stores the tag 306 in corresponding bytes and/or bits in header 302. Note that, although tag 306 is shown in FIG. 3 as a single block or field, tag 306 or portions thereof may be distributed or interleaved among other blocks or fields in header 302.

Request packet 300 also includes payload 308, which is a portion or section of request packet 300 in which data and/or information destined for a completing device is included. For example, if request packet 300 is a request for a memory write that is destined for a memory controller completer, payload 308 can include one or more bytes of data to be written to memory. Although request packet 300 is shown with a payload 308, certain packets do not include a payload. For example, request packets 300 in which header 302 contains all of the information necessary for a completer to process or handle the request packet 300 may lack a payload.

Along with request packets, in some embodiments, the communication specification dictates that completers include tags in certain response packets that are used for communicating responses to requesters. For example, in some embodiments, when transmitting a response packet to a requester in response to a given request packet (e.g., for memory accesses, IO data accesses, etc.), a completer is to include a copy of a tag that is acquired from the given request packet (or information based thereon) in the response packet. As described above, this can enable the requester to associate the response packet/response with the request packet/request. Although a response packet is not shown in FIG. 3, in some embodiments, response packets are arranged similarly to request packet 300. In other words, response packets include some or all of the same fields and information and/or arrangement of fields and information shown in request packet 300. For example, in some embodiments, a response packet can include a tag in its header similar to what is shown in FIG. 3, a payload, etc.

Returning now to the use of tags as dictated by the communication specification, in the described embodiments, the communication specification further dictates that all outstanding request packets that include tags from a requester should have unique tags with respect to tags in other outstanding request packets from that requester. For example, if four bit tags are used in request packets, when request packet with a tag of 0110 (or any other allowable four bit value) is outstanding, no other outstanding request packet should have a tag of 0110. In other words, at any given time, in accordance with the communication specification, each outstanding request packet from a requester that should have a tag that is different from tags in other request packets from that requester. As used herein, a request packet is "outstanding" between a time when the requester generates the request packet (i.e., includes a tag in the request packet) and when the tag is returned to the requester from the completer in a response packet. This includes after the request packet has been generated by a requester and is in internal elements of the requester (e.g., awaiting transmission), is in flight on links between the requester and a completer, is in internal elements of intermediary devices, is in internal elements of the completer, etc. In addition, as used herein, "internal elements" include some or all of receiving elements/circuitry for receiving request packets, processing elements/circuitry for processing, directing, or otherwise handling request packets, and transmitting elements/circuitry for sending response packets (e.g., interface circuitry, buffering circuitry, routing circuitry, scheduling circuitry, processing circuitry, etc.).

In the described embodiments, the above-described requirement of the communication specification that request packets in internal elements of a completer from a requester have unique tags with respect to one another is used to avoid certain erroneous/incorrect operations. For example, in some embodiments, completers may process, and thus respond to, request packets out of order. If two request packets having the same tags are present in the internal elements of the completer, therefore, it is possible for the completer to process the second/later of the request packets out of order with respect to the first of the request packets. In this case, because the completer includes tags from the request packets in response packets, a requester may incorrectly associate the response packet for the second request packet with the first request packet. Request packets and the corresponding response packets that are "in flight" between the requester and the completer, however, are not yet present in the internal elements of the completer and thus are not exposed to the possibility of reordering by the completer. Request packets that are in flight therefore need not have unique tags with respect to request packets in internal elements of the completer. Request packets are considered to be in flight when the request packets are generated but not yet transmitted by a requester or the request packets are being transmitted on links and/or are in internal elements of intermediary devices on links of a send path between the requester and the completer. There is therefore a moving "window" (or set, block, portion, etc.) of request packets in a sufficiently long sequence of request packets sent from a requester in which each of the request packets should have a unique tag with respect to other request packets in order to avoid the above-described reordering problem. The "window" includes a given number of request packets that is sufficient to fill the internal elements of the completer. For example, assuming that the internal elements of the completer can hold 25 request packets, the window is 25 request packets in size. In a sequence of 250 request packets, therefore, the window occupies approximately 10% of the sequence. The window is "moving" because request packets are eventually processed by the completer and corresponding response packets (with tags) are returned to the requester. Once a request packet in a window is processed, and thus is no longer in the internal elements of the completer, the completer can receive a subsequent request packet—in a different window—in its place. Tags in request packets outside of each window, however, need not be unique with respect to tags inside of that window.

In the described embodiments, requesters take advantage of the fact that the tags of in flight request packets can be non-unique with respect to tags in internal elements in the completer to continue sending request packets in situations in which existing requesters run out of tags and are forced to stall. In existing requestors, for example, when a sequence of request packets that includes each allowable tag (e.g., 1024 request packets for 10 bit tags, etc.) has been transmitted to a completer and no corresponding responses have been received, the requester stalls to await the return of responses from the requester to free up tag values for reuse in transmitting subsequent request packets. In contrast, in the described embodiments, when a sequence of request packets that includes each allowable tag has been transmitted to a completer, requesters can continue to send request packets to completers with tags that are not unique with respect to tags in request packets from the requester that will be in the internal elements of the completer when the request packet initially arrives at the completer (i.e., just before the request packets themselves are in internal elements of the completer). The tags in request packets that the requesters send to the completer are, however, unique with respect to tags in other request packets from the requester that will be in the internal elements of the completer when the request packet is in the internal elements of the completer. In other words, and continuing the moving window example from above, the tags in request packets in any given window are unique with respect to one another, while tags outside of the given window are not assured of being unique with respect to tags in that given window. While contravening the rules of the communication standard, the requester avoids the problem of the reordering of request packets with duplicated tags and takes advantage of in flight time for request packets (i.e., the latency of the requester and links and intermediate devices) to transmit additional request packets.

In some embodiments, before sending a request packet to a completer, a requester generates the request packet including various information (e.g., header information, payload (if necessary), etc.) in accordance with the communication specification. The requester, as part of generating the request packet, selects a tag to be included in the request packet. For example, selecting the tag may mean advancing a tag counter that is kept by the requester to a next value and using a value of the tag counter as the tag—or otherwise using a next value in a sequence of values for the tags (e.g., a Grey code, etc.). As another example, selecting the tag may mean acquiring the tag from an available "pool" or set of tags in accordance with one or more rules or algorithms (e.g., lowest available tag value, etc.). In embodiments where a pool of tags is used, tags returned to requesters in response packets are returned to the pool of tags and thereby made freely available for use in subsequent request packets (i.e., made available for use in all request packets).

In some embodiments, as part of the process for selecting a tag, the requester determines if the tag is permissible for use in a request packet. For determining whether a tag is permissible, the requester determines whether, when the request packet arrives at the completer (i.e., just before the request packet itself is taken into the internal elements of the completer), internal elements of the completer will be full of request packets from the requester that have unique tags with respect to tags in other request packets from the requester in the internal elements of the completer. Continuing the moving window example, the requester determines if a full window of request packets will be in the completer at the time of the request packet's arrival. If the internal elements of the completer will be full of request packets from the requester that have unique tags, the requester can send a request packet with a tag that is not unique with respect to tags in request packets from the requester that will be in the internal elements of the completer. The requester therefore generates and sends a request packet with a tag for a subsequent window. If, on the other hand, when the other request packet arrives at the completer, internal elements of the completer will not be full of request packets from the requester, the requester sends the request packet with a tag that is unique with respect to tags in other request packets from the requester that will be in the internal elements of the completer. That is, the requester generates and sends a request packet with a tag that is in a given window.

Processes for Using Tags in Request Packets

Figure 4:
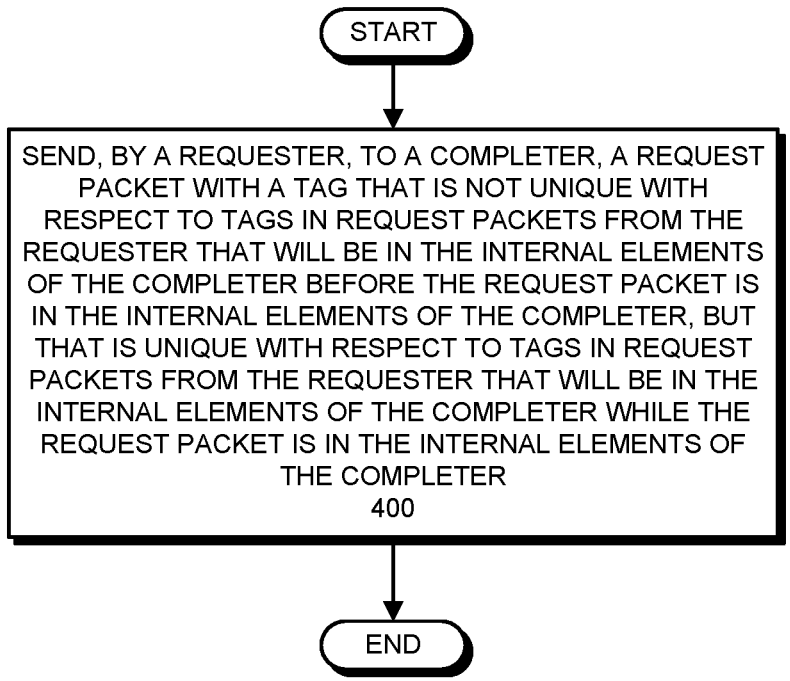
FIG. 4 presents a flowchart illustrating a process for sending a request packet with a tag from a completer to a requester in accordance with some embodiments.

In the described embodiments, requesters send, to completers, request packets for initiating or continuing transactions between the requesters and the completers. The requesters include, in the request packets, tags that are used for identifying the request packets among request packets sent by the requesters to the completers. FIG. 4 presents a flowchart illustrating a process for sending a request packet with a tag from a completer to a requester in accordance with some embodiments. FIG. 4 is presented as a general example of operations performed by requesters in some embodiments. In some embodiments, however, requesters perform different operations and/or perform the operations in a different order.

The operation in FIG. 4 includes a requester sending, to a completer, a request packet with a tag that is not unique with respect to tags in request packets from the requester that will be in the internal elements of the completer before the request packet is in the internal elements of the completer, but that is unique with respect to tags in request packets from the requester that will be in the internal elements of the completer while the request packet is in the internal elements of the completer (step 400). For this operation, the requester, e.g., hardware circuitry and/or software/firmware executed by the requester, determines that a request packet is to be sent to the completer in order to initiate a transaction with the completer. For example, the requester may be a graphics processing unit or an input-output device and the requester may need to access data stored in a memory in or associated with the completer. The requester therefore generates a request packet (e.g., request packet 300) that includes information to be used by the completer to identify and perform the transaction. The requester then sends the request packet to the completer via network link(s) between the requester and the completer.

Figure 5:
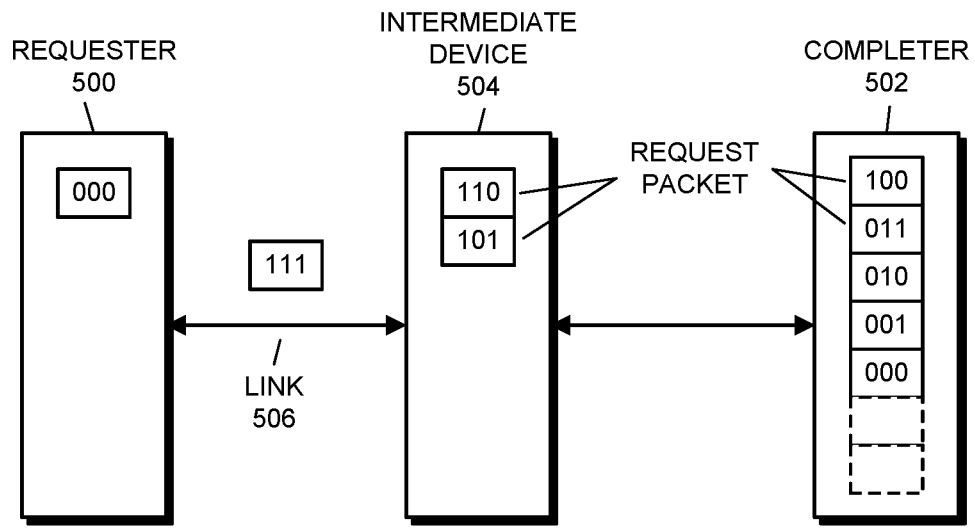
FIG. 5 presents a block diagram illustrating request packets sent from a requester to a completer in accordance with some embodiments.

As described for step 400, a tag that is included in the request packet by the requester is unique with respect to tags in other request packets that will be in the internal elements of the completer at the same time as the request packet, but is not unique with respect to tags in other request packets that will be in the internal elements of the completer before the request packet is in the internal elements of the completer. FIG. 5 presents a block diagram illustrating request packets sent from requester 500 to completer 502 in accordance with some embodiments. Although certain tag values, devices/elements, and internal capacities for storing/holding request packets are shown as an example in FIG. 5, in some embodiments, different tag values, devices/elements, and/or internal capacities for storing/holding request packets are used.

For the example in FIG. 5, it is assumed that three bit tags are used. In other words, each request packet includes a tag that is three bits long—and there are therefore eight possible tag values. It is further assumed that the internal elements of completer 502 have the capacity for simultaneously holding/storing seven request packets. In other words, buffers, processing circuitry, and/or other circuitry in completer 502 can simultaneously hold up to seven request packets (i.e., seven request packets that may be processed out of order/reordered by completer 502 as described herein). The moving window for request packets to have unique tags with respect to one another is therefore seven request packets in length.

As can be seen in FIG. 5, requester 500 has already sent eight request packets to completer 502 with tags 000-111 (for clarity, only a few of the request packets are labeled in FIG. 5) and all eight request packets remain outstanding. Five of the eight request packets, i.e., request packets with tags 000-100, are held/stored in the internal elements of the completer (the capacity for storing two additional packets in the internal elements is presently unused as shown by the dashed boxes in completer 502). The request packets with tags 101-110 are held/stored in, or passing through, internal elements of intermediate device 504—e.g., are in a buffer awaiting forwarding by intermediate device 504. The request packet with tag 111 is being transmitted on link 506. Requester 500 has generated a ninth request packet with tag 000 and is preparing to transmit the ninth request packet to completer 502 on link 506. As described above, ninth request packet has a tag (000) that is unique with respect to other tags that will be in the internal elements of the completer at the same time as the ninth request packet but is not unique with respect to tags in request packets that are presently in completer 502. In other words, because the internal elements of completer 502 are limited to storing seven request packets, the first request packet with the tag 000 will need to be processed and thereby removed from the internal elements of completer 502 before the second request packet with the tag 000 can be stored in the internal elements of completer 502. Given the capacity of its internal elements, however, completer 502 will store, at most, request packets with tags 010-111 when the second request packet with the tag 000 arrives in the internal elements of completer 502. Although sending request packets with tags in this way runs contrary to the dictation of the communication specification in use, requester 500 and completer 502 will continue in correct operation because the reordering problem as described elsewhere herein does not affect the first and second request packets having the 000 tag values.

In some embodiments, including the embodiment shown in FIG. 5, requesters use sequential tags for ensuring that tags in request packets will be unique with respect to tags in other request packets that will be in the internal elements of the completer at the same time as the request packets. In these embodiments, a requester knows or assumes that the capacity of the internal elements of the completer for holding/storing request packets with tags is smaller than a number of allowable tags. For example, the requester can have or acquire information about the capacity of the internal elements of the completer for holding/storing request packets. For instance, the requester can be programmed or provided with information about the capacity of the internal elements of the completer by a designer, an installer, another functional block, etc. As another example, the requester can be programmed, designed, or otherwise configured to make an assumption about the capacity of the internal elements of the completer for holding/storing request packets, e.g., based on the fact that a number of allowable tags (e.g., 16 bit tags, 32 bit tags) is large enough that a practical completer is very unlikely to have internal elements sufficient for holding/storing request packets with each of the allowable tags. When sending request packets to a completer, therefore, the requester sends request packets in a sequence of request packets with respective sequential tags—and starts the sequence over from a beginning of the sequence upon reaching an end of the sequence (e.g., starts over with a lowest allowable tag once a highest allowable tag has been included in a request packet). This is shown in the example in FIG. 5, in which requester 500 is preparing to send a request packet with the tag 000 despite the internal elements of completer 502 presently holding/storing/including a request packet with tag 000—i.e., the request packet with the tag 000 still being outstanding. In other words, the requester does not halt sending request packets, despite each allowable tag having been included in an outstanding request packet, but instead automatically continues sending request packets with tags in sequence. Because the capacity of the internal elements of the completer for holding/storing request packets is smaller than the number of allowable tags, these embodiments can be assured that, or assume that, the sequence of/sequential tags in the internal elements of the completer (i.e., in a corresponding window) at any given time will be unique with respect to one another. In some of these embodiments, the requester uses a counter for generating tags in sequence, returning the counter to a lowest value (e.g., 0000 for 4 bit tags) once a request packet that includes a highest value (e.g., 1111 for 4 bit tags) has been sent to a completer.

Figure 6:
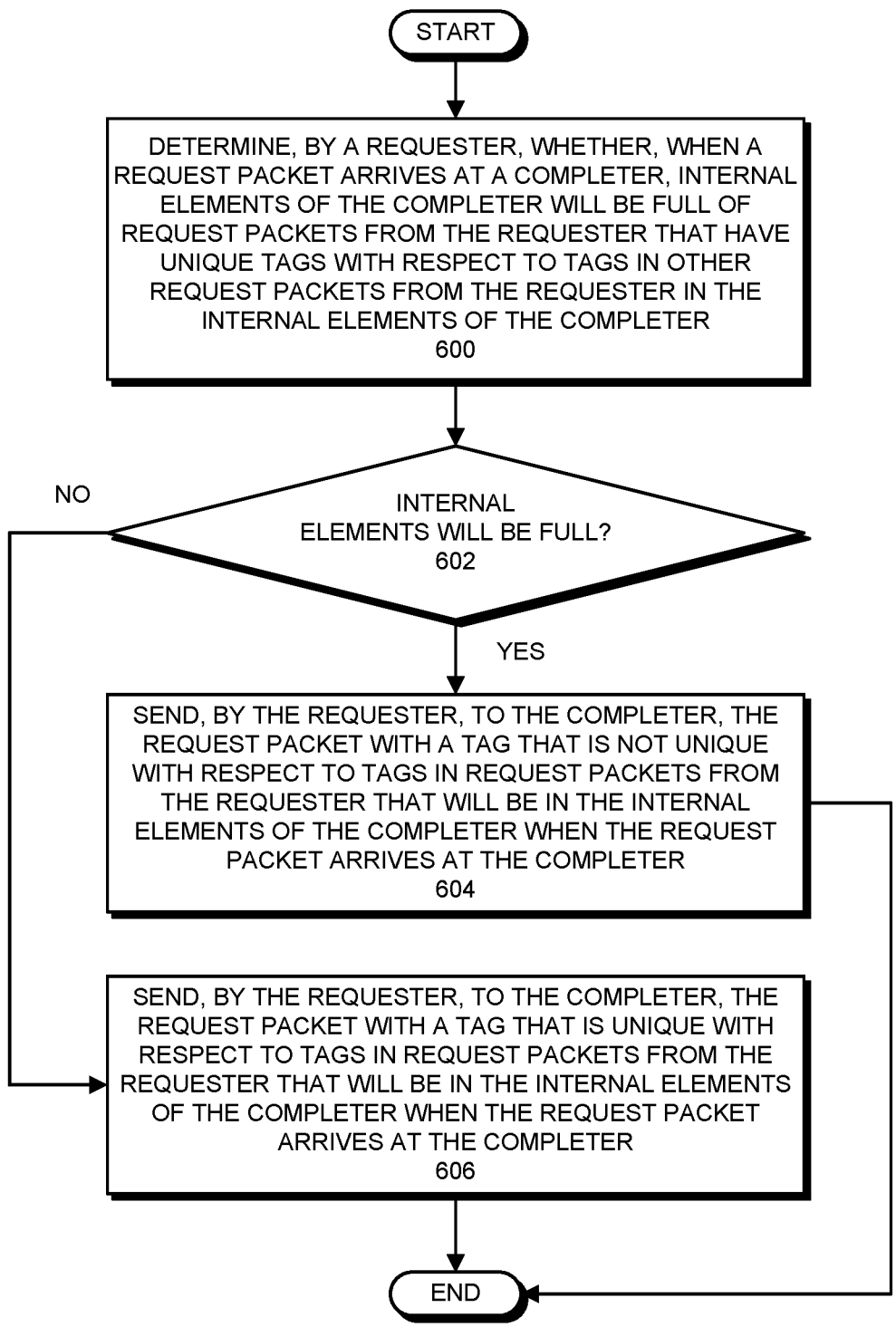
FIG. 6 presents a flowchart illustrating a process for sending a request packet with a tag from a completer to a requester in accordance with some embodiments.

FIG. 6 presents a flowchart illustrating a process for sending a request packet with a tag from a completer to a requester in accordance with some embodiments. Differently than the example shown in FIGS. 4-5, in which a requester automatically sends request packets with tags in sequence, for the embodiment in FIG. 6, a requester first determines whether internal elements of a completer will be full and then sends a request packet with a tag accordingly. FIG. 6 is presented as a general example of operations performed by requesters in some embodiments. In some embodiments, however, requesters perform different operations and/or perform the operations in a different order.

The operation in FIG. 6 starts when a requester determines whether, when a request packet arrives at a completer, internal elements of the completer will be full of request packets from the requester that have unique tags with respect to tags in other request packets from the requester in internal elements of the completer (step 600). For this operation, in some embodiments, the requester determines whether internal elements such as buffers, processing circuitry, etc. in the completer will be full of request packets with unique tags. In other words, the requester determines whether the completer will be fully occupied with processing prior request packets and thus will need to complete processing a prior request packet to free up space in the internal elements so that the request packet can be accepted for processing by the completer. In this way, the requester determines the nature of the tag that can be included in the request packet. That is, the requester determines whether the request packet will be included in a set of request packets in internal elements of the completer—and thus in a "window" of request packets in the internal elements of the completer—or will be outside of the window of request packets.

In some embodiments, for determining whether, when a request packet arrives at a completer, internal elements of the completer will be full of request packets from the requester that have unique tags, a requester determines if a given number of request packets have been sent to the completer without receiving corresponding response packets. For example, assuming that N-bit tags are in use, the requester can determine if $2^N$ request packets have been sent to the completer without yet receiving corresponding response packets. In this case, when all available tags have been used in outstanding/pending request packets, the requester can determine that the internal elements of the completer will be full of request packets.

In some embodiments, for determining whether, when a request packet arrives at a completer, internal elements of the completer will be full of request packets from the requester that have unique tags, a requester uses a information about the sending link/internal element latency for request packets. The sending link/internal element latency in these embodiments is a total or average time expected for request packets to be passing through and/or present in the sending link and the internal elements of the completer. In these embodiments, the requester uses information about the sending link/internal element latency for request packets along with information about the number of outstanding request packets (i.e., request packets for which a corresponding response packet has not yet been received) to determine whether the internal elements of the completer will be full. For example, in some embodiments, the requester can compare the sending link/internal element latency for request packets to the number of outstanding request packets (e.g., multiplied by a flight time) to determine whether the internal elements of the completer will be full. In some of these embodiments, the requester keeps track of how long packets have been in flight and uses this information in the comparison.

In some embodiments, for determining whether, when a request packet arrives at a completer, internal elements of the completer will be full of request packets from the requester that have unique tags, a requester uses information about an arrangement or configuration of intermediary network devices and/or internal elements in the completer. For example, the requester can use information about a maximum capacity or a present/current capacity, or "carrying capacity," for storing or buffering request packets in the intermediary network devices and/or internal elements of the completer. In these embodiments, the requester uses the information about the arrangement or configuration of intermediary network devices and/or internal elements in the completer along with information about the number of outstanding request packets to determine whether the internal elements of the completer will be full. For example, in some embodiments, the requester can compare the carrying capacity of the number of outstanding request packets to determine whether the internal elements of the completer will be full. In some of these embodiments, the requester keeps track of how long packets have been in flight and uses this information in the comparison.

When the internal elements of the completer will be full of request packets from the requester that have unique tags (step 602), the requester recognizes that the request packet need not have a tag that is unique with respect to tags in the internal elements of the completer as the packet arrives at the completer. The requester therefore sends, to the completer, the request packet with a tag that is not unique with respect to tags in request packets from the requester that will be in the internal elements of the completer when the request packet arrives at the completer (step 604). For this operation, assuming (as a simplified example) two bit tags are used and that the internal elements of the completer can hold four request packets, when the requester has sent request packets with tags 00, 01, 10, and 11 in sequence immediately prior to sending the request packet described in FIG. 6, the completer can determine that the internal elements of the completer will be full of request packets with tags that are unique with respect to one another when the request packet will arrive at the completer, e.g., based on the arrangement of elements in the completer and the number of request packets sent (and when the request packets were sent). The requester can then send the packet in step 604 with the tag that is not unique with respect to the tags in request packets from the requester that will be in the internal elements of the completer when the request packet arrives at the completer. For example, in some embodiments, the requester returns from 11 to 00 and sends the request packet with the tag 00.

For the example above, before the request packet's arrival at the completer, the tag 00 will be duplicated by a tag in a previously-sent request packet in the internal elements of the completer—i.e., the first of the four request packets that were previously sent from the requester to the completer. The previously-sent request packet with tag 00, however, completes processing before the request packet can be accepted into the internal elements of the completer. The previously-sent request packet with the 00 tag will therefore not be present in the internal elements of the completer at the same time as the request packet with the 00 tag is in the internal elements of the completer.

Although, for step 604, the requester sends, to the completer, the request packet with a tag that is not unique with respect to tags in request packets from the requester that will be in the internal elements of the completer when the request packet arrives at the completer, the tag in the request packet is unique with respect to other request packets from the requester that will be in the internal elements of the completer while the request packet is in the internal elements of the completer. Continuing the moving window example from above, the tag in the request packet is unique with respect to the tags in other request packets in a same window as the request packet. Although sending request packets with tags in this way runs contrary to the dictation of the communication specification in use, the requester and the completer will continue in correct operation because the reordering problem as described herein does not affect the request packets having the duplicate tag values.

When the internal elements of the completer will not be full of request packets from the requester that have unique tags (step 602), the requester recognizes that the request packet should have a tag that is unique with respect to tags in other request packets in the internal elements of the completer as the request packet arrives at the completer. The requester therefore sends, to the completer, the request packet with a tag that is unique with respect to tags in request packets from the requester that will be in the internal elements of the completer when the request packet arrives at the completer (step 606). For this operation, again assuming that two bit tags are used and that the internal elements of the completer can hold four request packets, when the requester has sent request packets with tags 00, 01, and 10 in sequence immediately prior to sending the request packet described in FIG. 6, the completer can determine that the internal elements of the completer will not be full of request packets when the request packet will arrive at the completer, e.g., based on the arrangement of elements in the completer and the number of request packets sent (and when the request packets were sent). The completer can then send the packet in step 606 with the tag that is unique with respect to the tags in request packets from the requester that will be in the internal elements of the completer when the request packet arrives at the completer. For example, in some embodiments, the requester sends the request packet with the tag 11.

In some embodiments, although not shown in FIGS. 4 and 6, the requester subsequently receives a response packet from the completer that includes the tag described in FIGS. 4 and 6. Upon receiving the response packet, the requester uses the tag from the response packet to determine that the response packet is associated with the request packet described in FIGS. 4 and 6—and performs subsequent operations accordingly. For example, when the request packet is a request to acquire data from an IO device, the response packet includes the data. The requester acquires the data from the response packet and uses the data for performing subsequent operations (e.g., processing or storing the data from the IO device, etc.).

Enabling and Disabling Tag Usage

In some embodiments, requesters can be configured or enabled to use tags in request packets as described above. In other words, the requesters can be switched between using tags as in existing devices (which can mean, for example, stalling when tags run out in the requester) or continuing with tags for in flight request packets such as shown in FIGS. 4 and 6, etc. In these embodiments, requesters provide a hardware or software switch or configuration setting that enables or disables the use of non-unique tags for request packets. When the hardware or software switch or configuration setting is disabled, deasserted, etc., the requester uses tags for request packets as in existing devices. In contrast, when the hardware or software switch or configuration setting is enabled, the requester can use tags for request packets as described above.

In some embodiments, the above-described switch is permanently set to enable or disable the use of non-unique tags in request packets, such as at manufacture or at install. For example, in some of these embodiments, the switch is a hardware switch including circuitry such as a fuse, a ROM strap, and/or another device that is configured once to enable (or disable) a requester to use non-unique tags as described above. For instance, a fuse can be left whole so that the use of non-unique tags is enabled, or burned out (e.g., by passing a specified current across the fuse) so that the use of non-unique tags is disabled. In some embodiments, however, the above-described switch is reconfigurable and thus can be set and reset one or more times, e.g., at manufacture or install, at startup, at runtime, etc. For example, in some of these embodiments, a requester can be implemented on an integrated circuit chip and the "switch" can include enabling circuitry wired to a pin or input of a package in which the integrated circuit chip is packaged (e.g., a ball grid array package, etc.), with a signal on the pin or input enabling or disabling the use of non-unique tags in request packets.

In some embodiments, at least one electronic device (e.g., requester 102, etc.) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., requester 102, completer 104, network communication link 100, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a requester; and
   a link interface coupled between the requester and a link, wherein the requester is configured to send a request packet to a completer on the link via the link interface by:
      sending, to the completer via the link interface, the request packet with a tag that is not unique with respect to tags in other request packets from the requester that will be in the internal elements of the completer before the request packet is in the internal elements of the completer, but that is unique with respect to tags in other request packets from the requester that will be in the internal elements of the completer while the request packet is in the internal elements of the completer.

2. The electronic device of claim 1, wherein the requester is further configured to:
   acquire, from a tag value record, a value for the tag and include, in the request packet, the tag having the value for the tag; and
   advance the tag value record to a next value, the advancing including setting the tag value record to a next value in a sequence and returning the tag value record to a first value in the sequence when the tag value record is at a final tag value in the sequence.

3. The electronic device of claim 2, wherein the internal elements of the completer have a capacity for holding a number of request packets that is less than the highest allowable value for the tag value counter.

4. The electronic device of claim 1, wherein the requester is further configured to:
   send the request packet based on determining that, when the request packet arrives at the completer, internal elements of the completer will be full of request packets from the requester that have unique tags with respect to tags in other request packets from the requester in the internal elements of the completer.

5. The electronic device of claim 4, wherein the requester is configured to determine that the internal elements of the completer will be full based at least in part on a number of in flight request packets that were sent by the requester to the completer for which response packets have not yet been received from the completer.

6. The electronic device of claim 4, wherein the requester is configured to determine that the internal elements of the completer will be full based at least in part on a type and/or arrangement of network devices on the link and/or a type and/or arrangement of internal elements in the requester.

7. The electronic device of claim 6, wherein the internal elements of the completer include some or all of:
   receiving elements for receiving request packets;
   processing elements for processing request packets; and
   transmitting elements for sending response packets.

8. The electronic device of claim 1, wherein the requester is configured to:
   receive, from the completer via the link interface, a response packet, the response packet including the tag; and
   use the tag from the response packet to determine that the response packet is associated with the request packet for subsequent processing of the response packet.

9. The electronic device of claim 1, wherein:
   a communication specification in use on the link is a peripheral component interface express (PCIe) standard; and
   the tags are PCIe tags.

10. The electronic device of claim 1, wherein the requester is further configured to:
    perform the determining and sending operations based on receiving an input indicating that non-unique tags are allowed to be used.

11. A method for sending a request packet from a requester to a completer on a link via a link interface in the requester, the method comprising:
    sending, by the requester, the request packet with a tag that is not unique with respect to tags in other request packets from the requester that will be in the internal elements of the completer before the request packet is in the internal elements of the completer, but that is unique with respect to tags in other request packets from the requester that will be in the internal elements of the completer while the request packet is in the internal elements of the completer.

12. The method of claim 11, further comprising:
acquiring, by the requester, from a tag value record, a value for the tag and include, in the request packet, the tag having the value for the tag; and
advancing, by the requester, the tag value record to a next value, the advancing including setting the tag value record to a next value in a sequence and returning the tag value record to a first value in the sequence when the tag value record is at a final tag value in the sequence.

13. The method of claim 12, wherein the internal elements of the completer have a capacity for holding a number of request packets that is less than the highest allowable value for the tag value counter.

14. The method of claim 11, further comprising:
sending, by the requester, the request packet based on determining that, when the request packet arrives at the completer, internal elements of the completer will be full of request packets from the requester that have unique tags with respect to tags in other request packets from the requester in the internal elements of the completer.

15. The method of claim 14, further comprising:
determining, by the requester, that the internal elements of the completer will be full based at least in part on a number of in flight request packets that were sent by the requester to the completer for which response packets have not yet been received from the completer.

16. The method of claim 14, further comprising:
determining, by the requester, that the internal elements of the completer will be full based at least in part on a type and/or arrangement of network devices on the link and/or a type and/or arrangement of internal elements in the requester.

17. The method of claim 16, wherein the internal elements of the completer include some or all of:
receiving elements for receiving request packets;
processing elements for processing request packets; and
transmitting elements for sending response packets.

18. The method of claim 11, further comprising:
receiving, by the requester, from the completer via the link interface, a response packet, the response packet including the tag; and
using, by the requester, the tag from the response packet to determine that the response packet is associated with the request packet for subsequent processing of the response packet.

19. The method of claim 11, wherein:
a communication specification in use on the link is a peripheral component interface express (PCIe) standard; and
the tags are PCIe tags.

20. The method of claim 11, further comprising:
performing, by the requester, the determining and sending operations based on receiving an input indicating that non-unique tags are allowed to be used.

* * * * *